US008433323B2

(12) United States Patent
Tomizu et al.

(10) Patent No.: US 8,433,323 B2
(45) Date of Patent: Apr. 30, 2013

(54) COMMUNICATION TERMINAL, BASE STATION CONTROLLER AND MOBILE COMMUNICATION METHOD

(75) Inventors: Makoto Tomizu, Yokohama (JP); Kenji Kono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 913 days.

(21) Appl. No.: 12/158,685

(22) PCT Filed: Dec. 21, 2006

(86) PCT No.: PCT/JP2006/325556
§ 371 (c)(1),
(2), (4) Date: Jul. 29, 2009

(87) PCT Pub. No.: WO2007/072932
PCT Pub. Date: Jun. 28, 2007

(65) Prior Publication Data
US 2009/0305706 A1  Dec. 10, 2009

(30) Foreign Application Priority Data
Dec. 22, 2005  (JP) ................................. 2005-370176

(51) Int. Cl.
*H04W 4/00* (2009.01)
*H04W 36/00* (2009.01)

(52) U.S. Cl.
USPC ......................................... 455/437; 370/331

(58) Field of Classification Search .................. 455/434, 455/436, 437, 439, 440, 442, 450, 456.1
See application file for complete search history.

(56) References Cited

U.S. PATENT DOCUMENTS
6,937,583 B1 * 8/2005 Czaja et al. ................... 370/331

FOREIGN PATENT DOCUMENTS

| JP | 08-154269 | | 6/1996 |
|---|---|---|---|
| JP | 2001-224049 | | 8/2001 |
| JP | 2001224049 | A * | 8/2001 |
| JP | 2002-300644 | | 10/2002 |
| JP | 2004-015192 | | 1/2004 |
| JP | 2004-364035 | | 12/2004 |

* cited by examiner

*Primary Examiner* — Kent Chang
*Assistant Examiner* — Nathan Brittingham
(74) *Attorney, Agent, or Firm* — DLA Piper LLP (US)

(57) ABSTRACT

A communication terminal according to the present invention includes a determination unit configured to determine whether or not each channel should be set as a handoff candidate on the basis of receiving quality of a pilot signal, and a channel information report transmitter configured to transmit a channel information report for setting a specific channel as a handoff candidate if the number of channels set as handoff candidates in the same sector reaches a predetermined number or more by setting the specific channel as a handoff candidate.

8 Claims, 10 Drawing Sheets

| CARRIER | PILOT SIGNAL RECEIVED SIGNAL STRENGTH | HANDOFF CANDIDATES |
|---|---|---|
| α1 | −65dB | ○ |
| α2 | −68dB | ○ |
| α3 | −70dB | ○ |
| α4 | −63dB | ○ |
| α5 | −69dB | ○ |
| β1 | −88dB | × |
| β2 | −89dB | × |
| β3 | −83dB | × |
| β4 | −85dB | × |
| β5 | −79dB | ×(○) |

(a)

| CARRIER | PILOT SIGNAL RECEIVED SIGNAL STRENGTH | HANDOFF CANDIDATES |
|---|---|---|
| α1 | −65dB | ○ |
| α2 | −68dB | ○ |
| α3 | −70dB | ○ |
| α4 | −63dB | ○ |
| α5 | −69dB | ○ |
| β1 | −88dB | × |
| β2 | −89dB | × |
| β3 | −83dB | × |
| β4 | −85dB | × |
| β5 | −79dB | ×(○) |

(b)

| CARRIER | PILOT SIGNAL RECEIVED SIGNAL STRENGTH | HANDOFF CANDIDATES |
|---|---|---|
| α1 | −83dB | ○ |
| α2 | −85dB | ○ |
| α3 | −88dB | ○ |
| α4 | −87dB | ○ |
| α5 | −79dB | ○ |
| β1 | −84dB | × |
| β2 | −88dB | × |
| β3 | −78dB | ○ |
| β4 | −75dB | ○ |
| β5 | −77dB | ○ |

(d)

| CARRIER | PILOT SIGNAL RECEIVED SIGNAL STRENGTH | HANDOFF CANDIDATES |
|---|---|---|
| α1 | −95dB | ○ |
| α2 | −98dB | ○ |
| α3 | −103dB | × |
| α4 | −102dB | × |
| α5 | −105dB | × |
| β1 | −70dB | ○ |
| β2 | −72dB | ○ |
| β3 | −71dB | ○ |
| β4 | −75dB | ○ |
| β5 | −72dB | ○ |

(e)

| CARRIER | PILOT SIGNAL RECEIVED SIGNAL STRENGTH | HANDOFF CANDIDATES |
|---|---|---|
| α1 | −96dB | ×(○) |
| α2 | −103dB | × |
| α3 | −107dB | × |
| α4 | −105dB | × |
| α5 | −110dB | × |
| β1 | −65dB | ○ |
| β2 | −69dB | ○ |
| β3 | −68dB | ○ |
| β4 | −70dB | ○ |
| β5 | −68dB | ○ |

COMMUNICATION TERMINAL, BASE STATION CONTROLLER AND MOBILE COMMUNICATION METHOD

TECHNICAL FIELD

The present invention relates to a communication terminal that is configured to perform communication using channels set between itself and multiple sectors, a base station controller that is configured to control the communication using the channels set between the communication terminal and the multiple sectors, and a mobile communication method to perform the communication using the channels set between the communication terminal and the multiple sectors.

BACKGROUND ART

In recent years, "cdma2000 1x-EV DO" has been developed as a high speed radio communication system (for example, Japanese Patent Application Publication No. 2002-300644).

As shown in FIG. 1, a mobile communication system to which "cdma2000 1x-EV DO" is applied includes multiple base stations (a base station that manages a sector α, a base station that manages a sector β and the like) and a base station controller PCF (Packet Control Function) that is configured to control communication performed using channels set between each of the sectors α and β and a communication terminal AT.

In such a mobile communication system, it is assumed that the communication terminal AT is configured to perform communication using multiple carriers (multicarrier) set between itself and one or multiple sectors.

DISCLOSURE OF THE INVENTION

However, when the communication terminal AT performs communication simultaneously using channels set between itself and multiple sectors, the number of sectors to be controlled for the communication of one communication terminal AT by the base station controller PCF is increased. This causes a problem of increasing a load on the mobile communication system side.

The present invention has been made in view of the aforementioned circumstances, and it is an object of the present invention to provide a communication terminal, a base station controller and a mobile communication method that reduce a load on a mobile communication system side by preventing each communication terminal from setting channels the number of which is less than a predetermined number, between itself and each sector.

A first aspect of the present invention is summarized as a communication terminal configured to perform communication using channels set between itself and multiple sectors, comprising a determination unit configured to determine whether or not each channel should be set as a handoff candidate on the basis of receiving quality of a pilot signal; and a channel information report transmitter configured to transmit a channel information report for setting a specific channel as a handoff candidate if the number of channels set as handoff candidates in the same sector reaches a predetermined number or more by setting the specific channel as a handoff candidate.

In the first aspect of the present invention, even when it is determined that the specific channel should be set as a handoff candidate, the channel information report transmitter may be configured not to transmit the channel information report for setting the specific channel as a handoff candidate if the number of channels set as handoff candidates in the same sector does not reach the predetermined number or more.

According to the aforementioned invention in the communication terminal, even when it is determined that the specific channel should be set as a handoff candidate on the basis of the receiving quality of the pilot signal, the specific channel is not set as a handoff candidate unless the number of channels set as handoff candidates in the same sector reaches the predetermined number or more by setting the specific channel as a handoff candidate, and therefore the communication terminal can avoid formation of a state in which channels the number of which is less than the predetermined number are set in the same sector.

A second aspect of the present invention is summarized as a communication terminal configured to perform communication using channels set between itself and multiple sectors, comprising a determination unit configured to determine whether or not each channel should be set as a handoff candidate on the basis of receiving quality of a pilot signal; and a channel information report transmitter configured to transmit a channel information report for releasing all the channels set as handoff candidates in the same sector from serving as the handoff candidates if the number of channels set as handoff candidates in the sector is reduced below a predetermined number by releasing a specific channel from serving as a handoff candidate.

In the second aspect of the present invention, when it is determined that the specific channel is not set as a handoff candidate and if the number of channels set as handoff candidates in the sector is not reduced below the predetermined number by releasing the specific channel from serving as a handoff candidate, the channel information report transmitter may be configured to transmit a channel information report for not setting only the specific channel as a handoff candidate.

According to the aforementioned invention, in the communication terminal, when it is determined that the specific channel should not be set as a handoff candidate on the basis of the receiving quality of the pilot signal, none of the channels set in the sector are set as handoff candidates if the number of channels set as handoff candidates in the sector is reduced below the predetermined number by releasing the specific channel from serving as a handoff candidate, and therefore the communication terminal can avoid maintenance of a state in which channels the number of which is less than the predetermined number, are set in the same sector.

A third aspect of the present invention is summarized as a base station controller configured to control communication performed using channels set between a communication terminal and multiple sectors, comprising a channel information report receiver configured to receive a channel information report for setting a specific channel as a handoff candidate; and a channel assignment controller configured to assign a resource to the specific channel in the same sector when receiving the channel information report for setting the specific channel as a handoff candidate and if the number of channels set as handoff candidates in the sector reaches a predetermined number or more by setting the specific channel as a handoff candidate.

In the third aspect of the present invention, even when receiving the channel information report for setting the specific channel as a handoff candidate, the channel assignment controller may be configured not to assign a resource to the specific channel in the sector if the number of channels set as handoff candidates in the sector does not reach the predetermined number or more by setting the specific channel as a handoff candidate.

According to the aforementioned invention, in the base station controller, even when receiving the channel information report for setting the specific channel as a handoff candidate, the specific channel is not set as a handoff candidate unless the number of channels set as handoff candidates in the same sector reaches the predetermined number or more by setting the specific channel as a handoff candidate, and therefore the base station controller can avoid formation of a state in which channels the number of which is less than the predetermined number are set in the same sector by the communication terminal.

A fourth aspect of the present invention is summarized as a base station controller configured to control communication performed using channels set between a communication terminal and multiple sectors, comprising a channel information report receiver configured to receive a channel information report for releasing a specific channel from serving as a handoff candidate; and a channel assignment controller configured to release assignment of resources from all channels set as handoff candidates in the same sector when receiving the channel information report for releasing the specific channel from serving as a handoff candidate and if the number of channels set as handoff candidates in the sector is reduced below a predetermined number by releasing the specific channel from serving as a handoff candidate.

In the fourth aspect of the present invention, when receiving the channel information report for releasing the specific channel from serving as a handoff candidate and if the number of channels set as handoff candidates in the sector is not reduced below the predetermined number by releasing the specific channel from serving as a handoff candidate, the channel assignment controller may be configured to release assignment of a resource from only the specific channel in the sector.

According to the aforementioned invention, in the base station controller, when receiving the channel information report for releasing the specific channel from serving as a handoff candidate, none of the channels set in the sector are set as handoff candidates it the number of channels set in the sector is reduced below the predetermined number by releasing the specific channel from serving as a handoff candidate, and therefore it is possible to avoid maintenance of a state in which channels the number of which is less than the predetermined number are set in the same sector.

A fifth aspect of the present invention is summarized as a mobile communication method for performing communication using channels set between a communication terminal and multiple sectors, comprising the steps of determining whether or not each channel should be set as a handoff candidate on the basis of receiving quality of a pilot signal in the communication terminal; transmitting a channel information report for setting a specific channel as a handoff candidate if the number of channels set as handoff candidates in the same sector reaches a predetermined number or more by setting the specific channel as a handoff candidate in the communication terminal; and assigning a resource to the specific channel according to the channel information report in a base station controller configured to control the communication.

A sixth aspect of the present invention is summarized as a mobile communication method for performing communication using channels set between a communication terminal and multiple sectors, comprising the steps of determining whether or not each channel should be set as a handoff candidate on the basis of receiving quality of a pilot signal in the communication terminal; transmitting a channel information report for not setting all channels set as handoff candidates in the same sector as handoff candidates if the number of channels set as handoff candidates in the sector is reduced below a predetermined number by releasing the specific channel from serving as a handoff candidate in the communication terminal; and releasing assignment of resources to all specific channels in the sector according to the channel information report in a base station controller configured to control the communication.

A seventh aspect of the present invention is summarized as a mobile communication method for performing communication using channels set between a communication terminal and multiple sectors, comprising the steps of determining whether or not each channel should be set as a handoff candidate on the basis of receiving quality of a pilot signal in the communication terminal; transmitting a channel information report for setting a specific channel as a handoff candidate in the communication terminal; and assigning a resource to the specific channel in the same sector when the channel information report is received and if the number of channels set as handoff candidates in the sector reaches a predetermined number or more by setting the specific channel as a handoff candidate in a base station controller configured to control the communication.

An eighth aspect of the present invention is summarized as a mobile communication method for performing communication using channels set between a communication terminal and multiple sectors, comprising the steps of determining whether or not each channel should be set as a handoff candidate on the basis of receiving quality of a pilot signal in the communication terminal; transmitting a channel information report for releasing a specific channel from serving as a handoff candidate in the communication terminal; and releasing assignment of resources to all channels set as handoff candidates in the same sector when the channel information report is received and if the number of channels set as handoff candidates in the sector is reduced below a predetermined number by releasing the specific channel from serving as a handoff candidate in a base station controller configured to control the communication.

BEST MODE FOR CARRYING OUT THE INVENTION (Configuration of Mobile Communication System according to the First Embodiment of the Present Invention)

Figure 1:
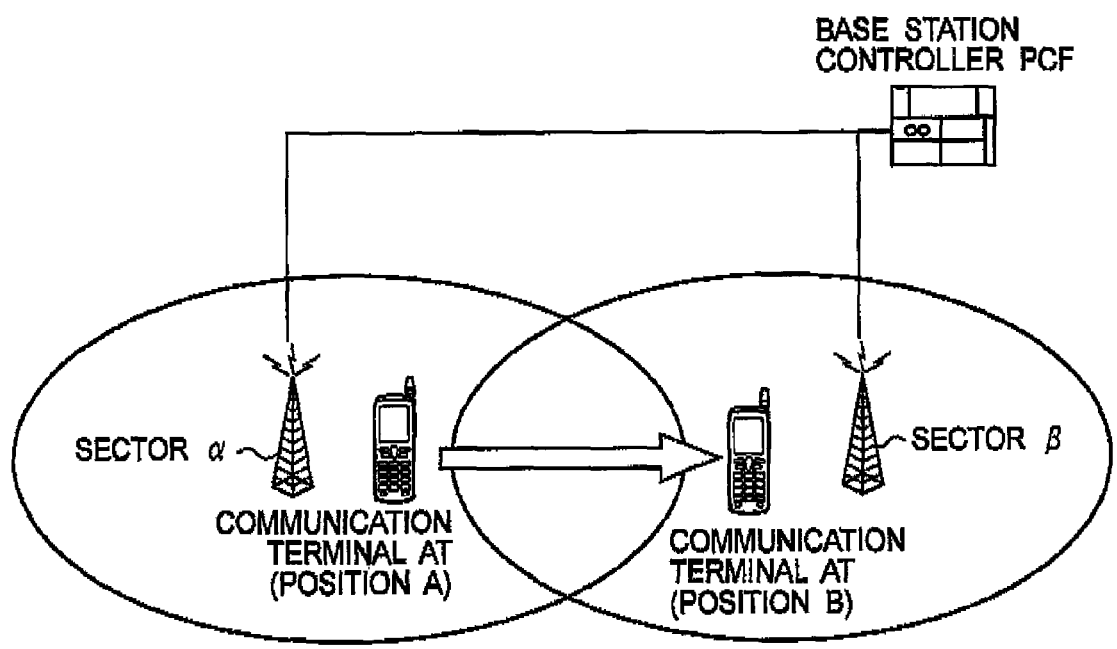
FIG. 1 is an entire configuration view of a general mobile communication system.
Figure 2:
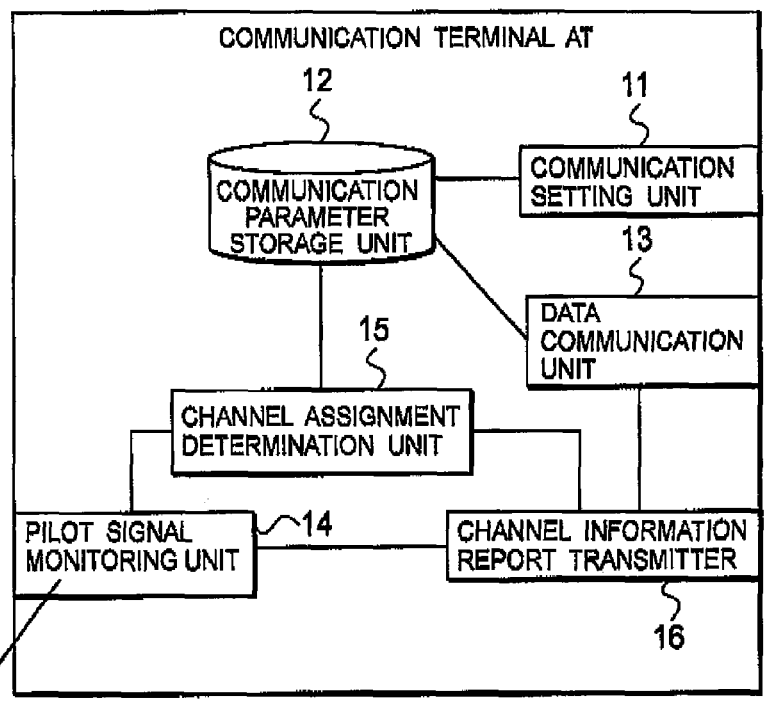
FIG. 2 is a functional block diagram of a communication terminal according to a first embodiment of the present invention.

The following will explain a configuration of a mobile communication system according to a first embodiment of the present invention with reference to FIG. 1 and FIG. 2. The mobile communication system according to the present embodiment uses "cdma2000 1x-EV DO system" and a communication terminal AT (Access Terminal) is configured to perform communication using multiple channels (multicarrier) set between itself and one or multiple sectors.

Specifically, as shown in FIG. 1, the mobile communication system according to the present embodiment includes multiple base stations (a base station that manages a sector α, a base station that manages a sector β or the like) and a base station controller PCF (Packet Control Function) that is configured to control communication to be performed using channels set between each of sectors α and β and the communication terminal AT.

It should be noted that, in this specification, the base stations are configured to control radio communications of communication terminals in multiple areas and a function (for example, an antenna or the like) of each base station that controls radio communication of the communication terminal in each area is expressed as a "sector."

The base station controller PCF according to the present embodiment is configured to control communication to be performed by using channels set between the communication terminal AT and each sector (for example, a first sector α or a second sector β).

For example, the base station controller PCF according to the present embodiment includes a function that distributes to each sector data destined for the communication terminal AT.

The communication terminal AT according to the present embodiment is configured to perform communication using multiple channels (multicarrier) set between itself and one or multiple sectors. In an example in FIG. 1, the communication terminal AT is configured to perform communication using channels set between itself and the first sector α or second sector β.

It should be noted that the communication terminal AT according to the present embodiment may be a radio communication terminal, a radio module, or a card terminal as long as the communication terminal AT is configured as above.

As shown in FIG. 2, the communication terminal AT according to the present embodiment includes a communication setting unit 11, a communication parameter storage unit 12, a data communication unit 13, a pilot signal monitoring unit 14, a channel assignment determination unit 15, and a channel information report transmitter 16.

The communication setting unit 11 is configured to perform a processing of traffic channel (TrCH) setting for performing data communication (packet communication) to be carried out by the communication terminal AT. Specifically, the communication setting unit 11 is configured to perform the processing of traffic channel (TrCH) setting by transmitting "Connection Request."

Moreover, the communication setting unit 11 is configured to acquire from the base station controller PCF communication parameters (for example, handoff candidate threshold, handoff candidate deletion threshold, handoff candidate minimum carrier number, minimum held carrier number, or the like) necessary for performing the data communication.

For example, the communication setting unit 11 may be configured to acquire the communication parameters by transmitting "Configuration Request."

The communication setting unit 11 may be configured to acquire the communication parameters at any timing. As a result, the communication parameters can be updated at any timing, so that they can be set to values appropriate for circumstances of the base station controller PCF in real times The communication parameter storage unit 12 is configured to store the communication parameters acquired by the communication setting unit 11. The data communication unit 13 is configured to perform data communication using the communication parameters stored by the communication parameter storage unit 12.

The pilot signal monitoring unit 14 is configured to monitor receiving quality (for example, received signal strength, SIR, CIR, or the like) of a pilot signal of each of the channels (carriers) set by the communication setting unit 11.

The pilot signal monitoring unit 14 is also configured to monitor receiving quality (for example, received signal strength, SIR, CR, or the like) of a pilot signal of a channel (for example, common control channel) to be transmitted from a peripheral sector of the communication terminal AT.

The channel assignment determination unit 15 is configured to determine whether or not each of channels set by the communication setting unit 11 should be set as a handoff candidate on the basis of the receiving quality of the pilot signal monitored by the pilot signal monitoring unit 14.

Specifically, when the receiving quality of the pilot signal of a specific channel falls below the handoff candidate threshold, the channel assignment determination unit 15 is configured to determine whether or not the specific channel should be set as a handoff candidate.

The channel information report transmitter 16 is configured to transmit a channel information report (RU: Route Update) of the specific channel set as a handoff candidate according to a determination result by the channel assignment determination unit 15.

For example, when it is determined that a specific channel in the second sector β should be set as a handoff candidate and if the number of channels set in the second sector β reaches a predetermined number (handoff candidate minimum carrier number) or more by setting the specific channel as a handoff candidate, the channel information report transmitter 16 is configured to transmit a channel information report (RU) of the specific channel (in a case where the number of channel settable sectors is increased in the communication terminal AT).

In this case, even when it is determined that the specific channel in the second sector β should be set as a handoff candidate, the channel information report transmitter 16 is configured not to transmit the channel information report RU of the specific channel unless the number of channels set in the second sector β reaches a predetermined number (handoff executed minimum carrier number) or more by setting the specific channel as a handoff candidate.

Moreover, when it is determined that the specific channel in the second sector β should not be set as a handoff candidate and if the number of channels set in the second sector β is reduced below a predetermined number (minimum held carrier number) by releasing the specific channel from serving as a handoff candidate, the channel information report transmitter 16 is configured to transmit a channel information report (RU) for releasing all the channels set as handoff candidates in the second sector β from serving as the handoff candidates (in a case where the number of channel settable sectors is decreased in the communication terminal AT).

In this case, even when it is determined that the specific channel should not be set as a handoff candidate, the channel information report transmitter 16 is configured to transmit a channel information report (RU) for not setting only the specific channel as a handoff candidate instead of all channels set in the second sector β unless the number of channels set in the second sector β is reduced below a predetermined number (minimum held carrier number) by releasing the specific channel from serving as a handoff candidate.

(Operation of the Mobile Communication System according to the First Embodiment of the Present Invention)

The following will explain an operation of the mobile communication system according to the first embodiment of the present invention with reference to FIG. 3 to FIG. 8.

Figure 3:
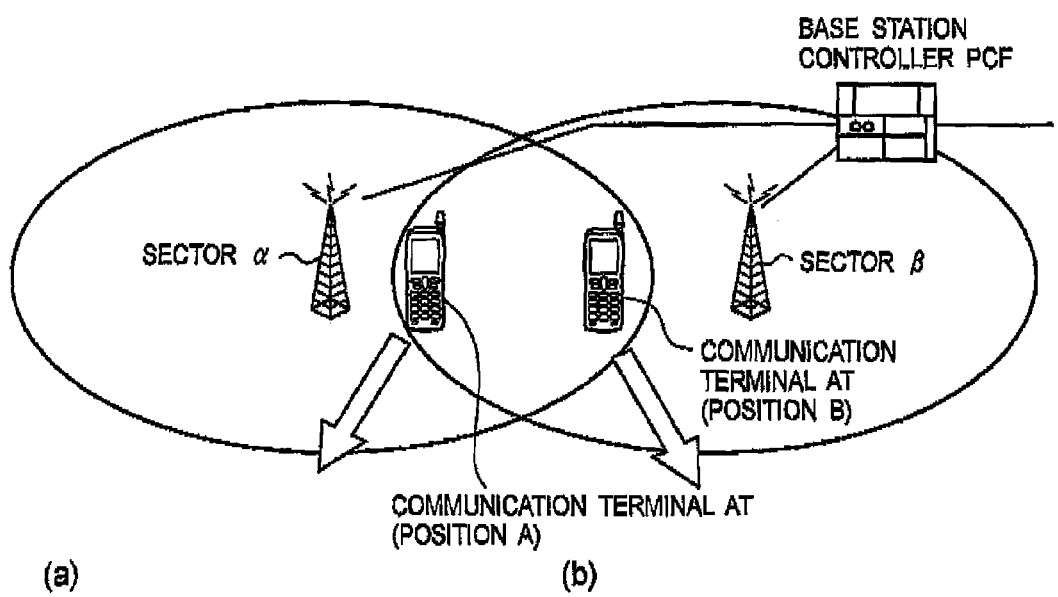
FIG. 3 is a view explaining handoff candidate addition processing when the number of sectors is increased in a mobile communication system according to the first embodiment of the present invention.

First, with reference to FIG. 3 to FIG. 5, an explanation will be given of an operation of the mobile communication system according to the present embodiment in the case where the number of sectors to be used when the communication terminal AT sets channels increases. In this case, as shown in FIG. 3, it is assumed that the communication terminal AT moves from a position A to a position B and the receiving quality of the pilot signal of each channel (carrier) is changed from Table a to Table b.

Figure 4:
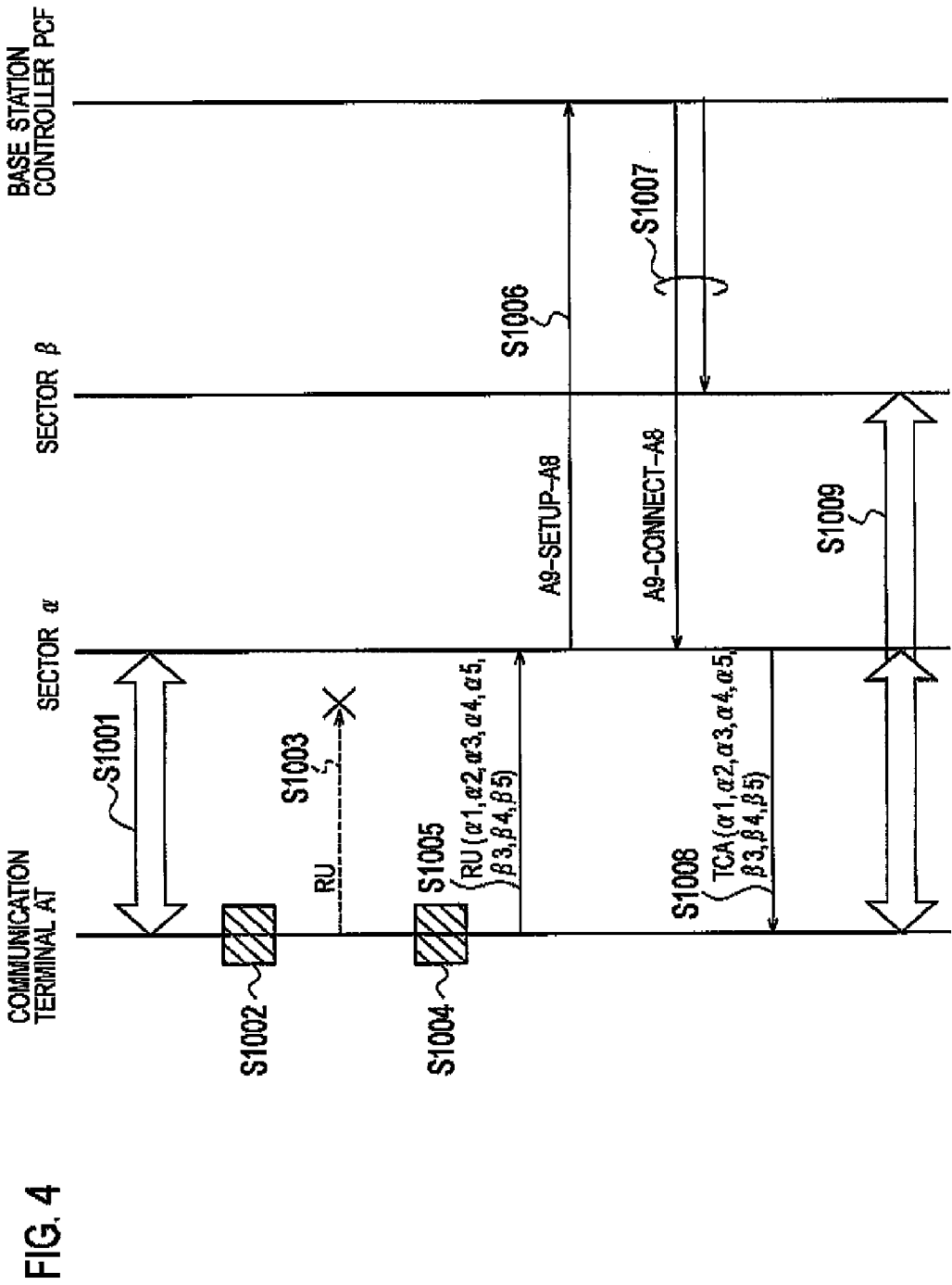
FIG. 4 is a sequence diagram showing handoff candidate addition processing when the number of sectors is increased in the mobile communication system according to the first embodiment of the present invention.

As shown in FIG. 4, in step S1001, the communication terminal AT is present at the position A and performs communication using channels α1 to α5 set between itself and the first sector α. Here, it is assumed that the handoff candidate threshold (received signal strength of the pilot a signal) is "−80 (dB)" and the handoff candidate minimum carrier number is "3."

In step S1002, it is assumed that the receiving quality of a pilot signal of channel β5 in the second sector β exceeds the handoff candidate threshold (see Table a).

In this case, the receiving quality of the pilot signal of channel β5 is "−79(dB)" and exceeds the handoff candidate threshold of "−80(dB)", and therefore the communication terminal AT determines that the channel β5 should be set as a handoff candidate; however, by setting the channel β5 as a handoff candidate, the number of channels set as handoff candidates in the second sector β becomes "1" (only channel β5) and the handoff candidate minimum carrier number does not reach "3" or more, and therefore the communication terminal AT does not transmit a channel information report (RU) for setting the channel β5 as a handoff candidate (see step S1003).

In step S1004, as a result of movement of the communication terminal AT to the position B, the receiving quality of a pilot signal of channel β3 becomes "−78 (dB)", the receiving quality of a pilot signal of channel β4 becomes "−75 (dB)" and the receiving quality of a pilot signal of channel β5 becomes "−77 (dB)" (see Table b).

As a result, the receiving quality of the pilot signals of channels β3 to β5 exceeds the handoff candidate threshold of "−80 (dB)", and therefore the communication terminal AT determines that the channels β3 to β5 should be set as handoff candidates, and by setting the channels β3 to β5 as handoff candidates, the number of channels set as handoff candidates in the second sector β reaches "3" and the handoff candidate minimum carrier number is "3" or more, and therefore the communication terminal AT transmits a channel information report (RU) for setting the channels β3 to β5 as handoff candidates (see step S1005).

It should be noted that RU (α1, α2, α3, α4, α5, β3, β4, β5) in step S1005 in FIG. 4 shows that receiving quality of channels α1, α2, α3, α4, α5, β3, β4, β5 exceeds the handoff candidate threshold.

In step S1006, the first sector α transmits to the base station controller PCF a message of "A9-Setup-A8" for notifying a channel information report (RU) for setting the channels β3 to β5 as handoff candidates according to the received channel information report.

In step S1007, the base station controller PCF assigns resources to the channels β3 to β5 in the second sector β according to the received message of "A9-Setup-A8" (channel information report).

Then, the base station controller PCF notifies the first sector α and second sector β of a result of the resource assignment (channels β3 to β5) by use of the message of "A9-Connect-A8."

In step S1008, the first sector α notifies the communication terminal AT of the result of the resource assignment (channels β3 to β5) in the second sector β by use of "TCA: Traffic Channel Assignment."

It should be noted that TCA (α1, α2, α3, α4, α5, β3, β4, β5) in step S1008 in FIG. 4 shows that channels α1, α2, α3, α4, α5, β3, β4, β5 are set as handoff candidates.

In step S1009, the communication terminal AT can optionally execute handoff of the channels β3 to β5 according to the received TCA and perform communication using the channels α1 and α2 set between itself and the first sector α and the channels β3 to β5 set between itself and the second sector β. Here, it is assumed that a threshold for not setting the channels as handoff candidates is set to "−100 (dB)."

Figure 5:
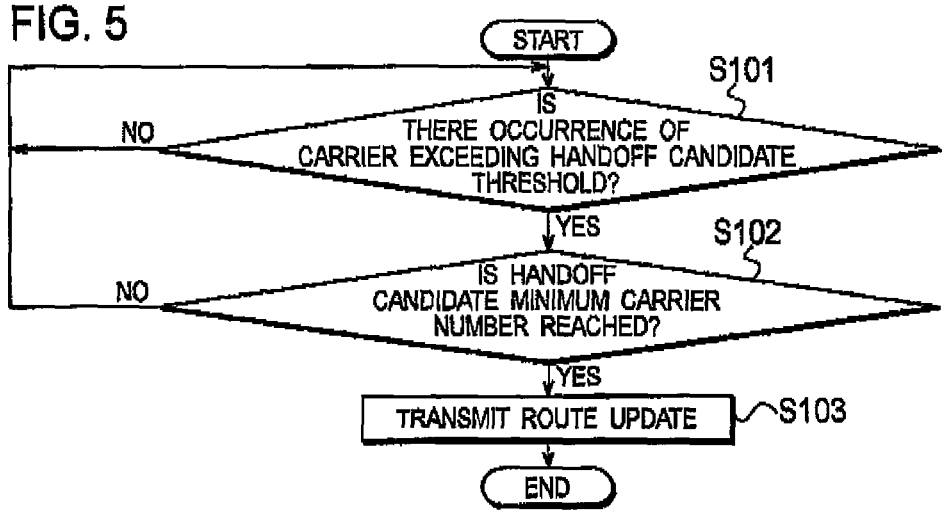
FIG. 5 is a flowchart showing an operation that determines whether or not a communication terminal should perform handoff candidate addition processing for increasing the number of sectors in the mobile communication system according to the first embodiment of the present invention.

In addition, FIG. 5 is a flowchart showing an operation that determines whether or not the aforementioned communication terminal AT transmits the channel information report (RU).

As shown in FIG. 5, in step S101, the communication terminal AT monitors whether or not there is an occurrence of a channel (one or multiple channels) that exceeds the handoff candidate threshold among channels (carriers) in each sector.

When such a channel occurs, in step S102 the communication terminal AT sets the channel as a handoff candidate and determines whether or not the number of channels set as handoff candidates in the same sector (the second sector β in this embodiment) reaches the handoff candidate minimum carrier number.

Here, when determining that the number of channels reaches the handoff candidate minimum carrier number, in step S103 the communication terminal AT transmits a channel information report (RU) for adding the channel as a handoff candidate, and when determining that the number of channels does not reach the handoff candidate minimum carrier number, the communication terminal AT returns to step S101 without transmitting the channel information report (RU) for adding the channel as a handoff candidate.

Figure 6:
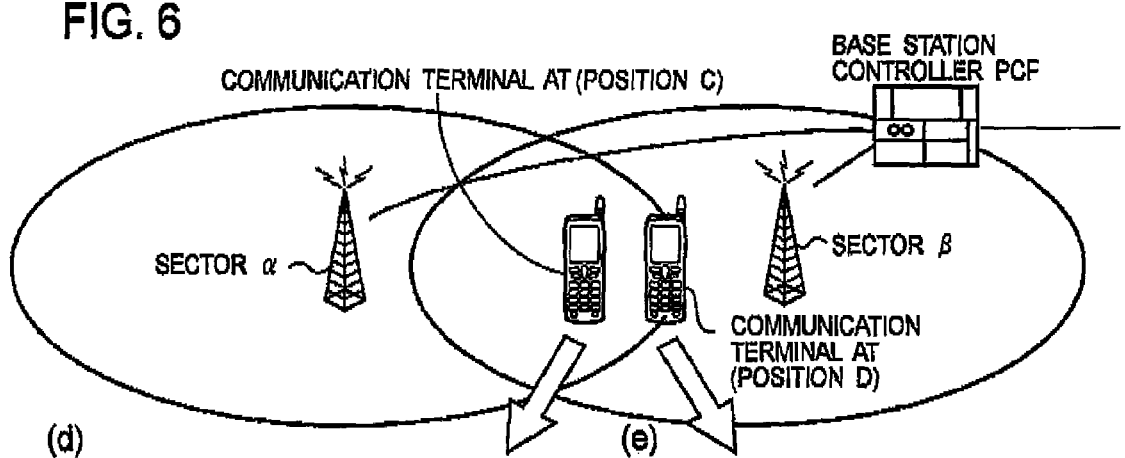
FIG. 6 is a view explaining handoff candidate deletion processing when the number of sectors is decreased in the mobile communication system according to the first embodiment of the present invention.

Second, with reference to FIG. 6 to FIG. 8, an explanation will be given of an operation of the mobile communication system according to the present embodiment in the case where the number of sectors to be used when the communication terminal AT sets channels decreases. In this case, as shown in FIG. 6, it is assumed that the communication terminal AT moves from a position C to a position D and receiving quality of the pilot signal of each channel (carrier) is changed from Table d to Table e.

Figure 7:
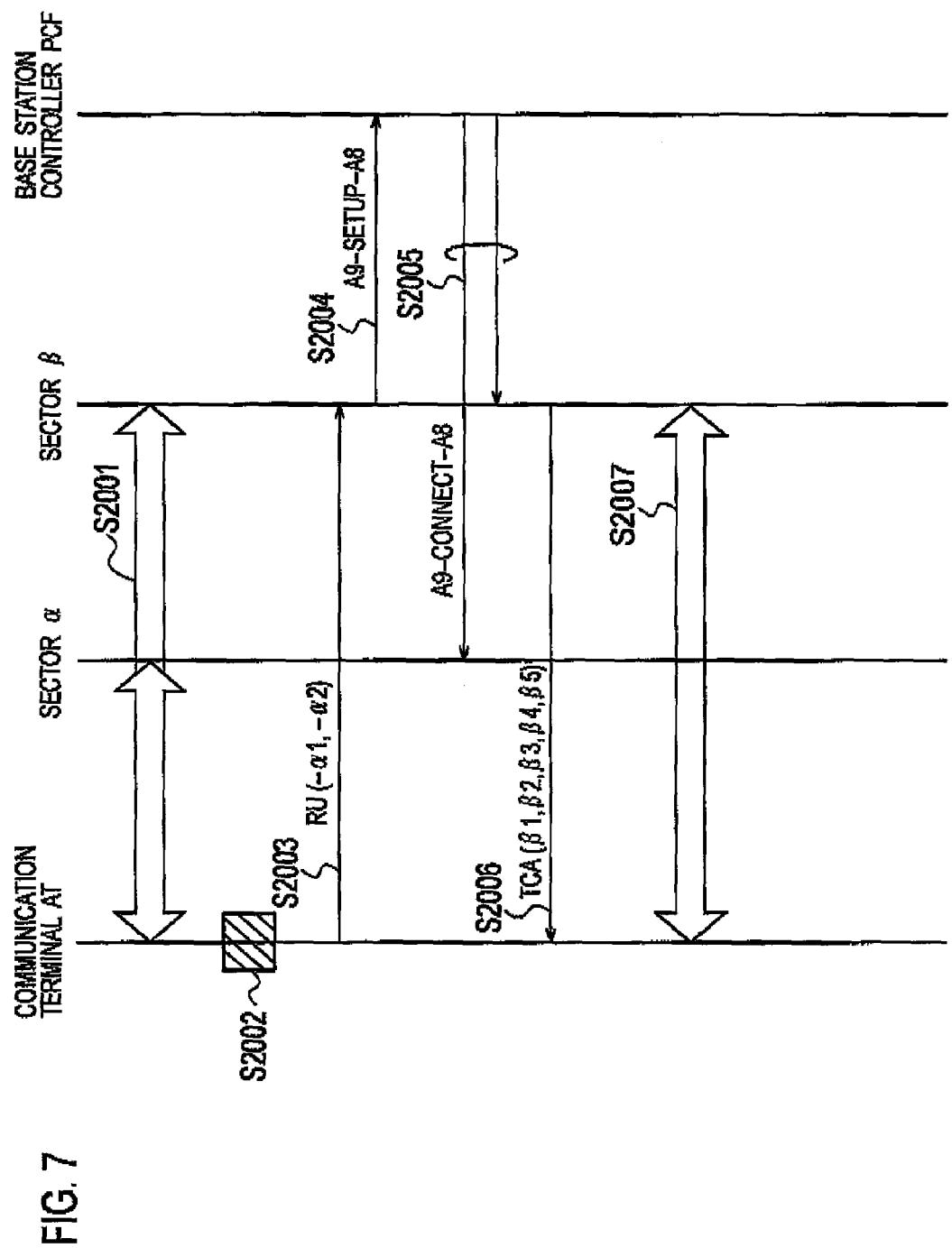
FIG. 7 is a sequence diagram showing handoff candidate deletion processing when the number of sector is decreased in the mobile communication system according to the first embodiment of the present invention.

As shown in FIG. 7, in step S2001, the communication terminal AT is present at the position C and performs communication using channels α1 and α2 set between itself and the first sector α and channels β1 to β5 set between itself and the second sector β. Here, it is assumed that a handoff candidate deletion threshold (received signal strength of the to pilot signal) is "−100 (dB)" and the minimum held carrier number is "2."

In step S2002, it is assumed that, as a result of movement of the communication terminal AT to the position D, receiving is quality of the pilot signal of channel α2 set between itself and the first sector α falls below the handoff candidate deletion threshold (see Table e).

In this case, the receiving quality of the pilot signal, of channel α2 becomes "−103 (dB)" and falls below the handoff candidate deletion threshold of "−100 (dB)", and therefore, by not setting the channel α2 as a handoff candidate, the number of channels set as handoff candidates in the first sector α becomes "1" (since the channels α2 to α5 are deleted from handoff candidates) and the minimum held carrier number is reduced below "2", and therefore (even if the receiving quality of the pilot signal of the channel α1 does not fall below the handoff candidate deletion threshold,) the communication terminal AT transmits a channel information report (RU (−α1, −α2)) for not setting the channel α1 as well as the channel α2 as a handoff candidate (deleting it from handoff candidates) (see step S2003).

In step S2004, the second sector β transmits to the base station controller PCF a message of "A9-Setup-A8" for notifying the channel information report (RU) for not setting the channels α1 and α2 as handoff candidates according to the received channel information report.

In step S2005, the base station controller PCF releases assignment of resources to the channels α1 and α2 in the first sector α according to the received message of "A9-Setup-A8" (channel information report).

Then, the base station controller PFC notifies the first sector α and second sector β of the resource assignment release result (channels α1 and α2) by use of the message of "A9-Connect-A8."

In step S2006, the second sector β notifies the communication terminal AT of the resource assignment release result (channels α1 and α2) in the first sector α by use of "TCA (β1, β2, β3, β4, β5)."

In step S2007, the communication terminal AT deletes the channels α1 and α2 from handoff candidates according to the received TCA and can perform communication using the channels β1 to β5 set between itself and the second sector β (see Table e).

In addition, FIG. B shows a flowchart illustrating an operation that determines whether or not the aforementioned communication terminal AT transmits the channel information report (RU).

Figure 8:
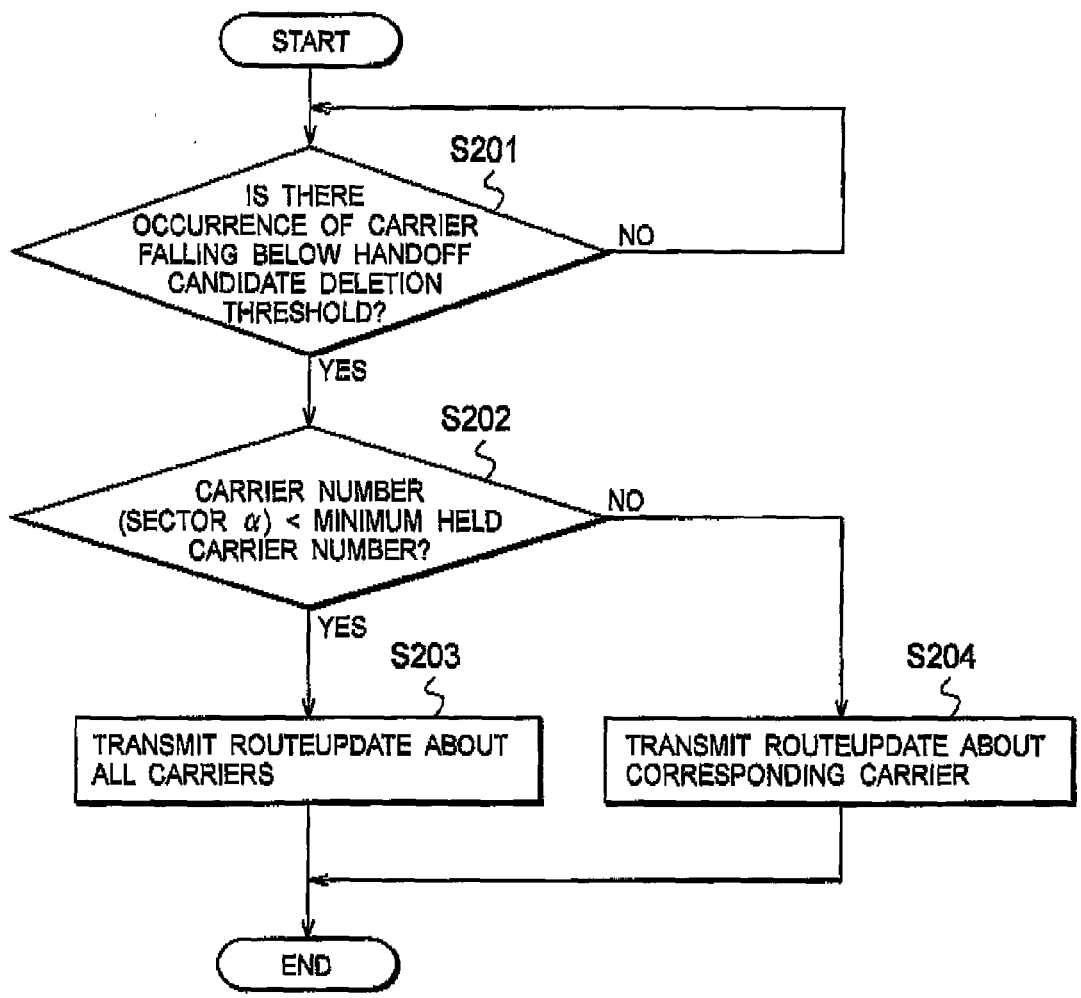
FIG. 8 is a flowchart showing an operation that determines whether or not a communication terminal should perform handoff candidate deletion processing for decreasing the number of sectors in the mobile communication system according to the first embodiment of the present invention.

As shown in FIG. 8, in step S201, the communication terminal AT monitors whether or not there is an occurrence of a channel (one or multiple channels) that falls below the handoff candidate deletion threshold among channels (carriers) in each sector.

When such a channel occurs, in step S202 the communication terminal AT deletes the channel from handoff candidates and determines whether or not the number of channels set as handoff candidates in the same sector (the first sector α in this embodiment) is reduced below the minimum held carrier number.

Here, when determining that the number of channels is reduced below the minimum held carrier number, in step S203 the communication terminal AT transmits a channel information report (RU) for releasing all the channels set in the same sector from serving as the handoff candidates (deleting them from handoff candidates), and when determining that the number of channels is not less than the minimum held carrier number, in step S204 the communication terminal AT transmits a channel information (RU) for not setting only the channel as a handoff candidate (deleting it from handoff candidates).

(Effects and Advantages of the Mobile Communication System according to the First Embodiment of the Present Invention)

According to the mobile communication system of the present embodiment, in the communication terminal AT, even when it is determined that the channel β5 in the second sector β should to be set as a handoff candidate on the basis of the receiving quality (received signal strength and the like) of the pilot signal, the channel β5 is not set as a handoff candidate unless the number of channels set as handoff candidates in the second sector β reaches the predetermined number (handoff candidate is minimum carrier number) or more by setting the channel β5 as a handoff candidate, and therefore the mobile communication system can avoid formation of a state in which channels the number of which is less than the predetermined number (handoff candidate minimum carrier number) are set between itself and the second sector β by the communication terminal AT.

According to the mobile communication system of the present embodiment, in the communication terminal AT, when it is determined that the channel α2 in the first sector α should not be set as a handoff candidate on the basis of the receiving quality (received signal strength and the like) of the pilot signal, all channels (channels α1 and α2) set as handoff candidates in the first sector α are deleted from handoff candidates if the number of channels set as handoff candidates in the first sector α is reduced below the predetermined number (minimum held carrier number) by deleting the channel α2 from handoff candidates, and therefore the mobile communication system can avoid maintenance of a state in which channels the number of which is less than the predetermined number (minimum held carrier number) are set between itself and the first sector α by the communication terminal AT.

(Configuration of the Mobile Communication System according to the Second Embodiment of the Present Invention)

Figure 9:
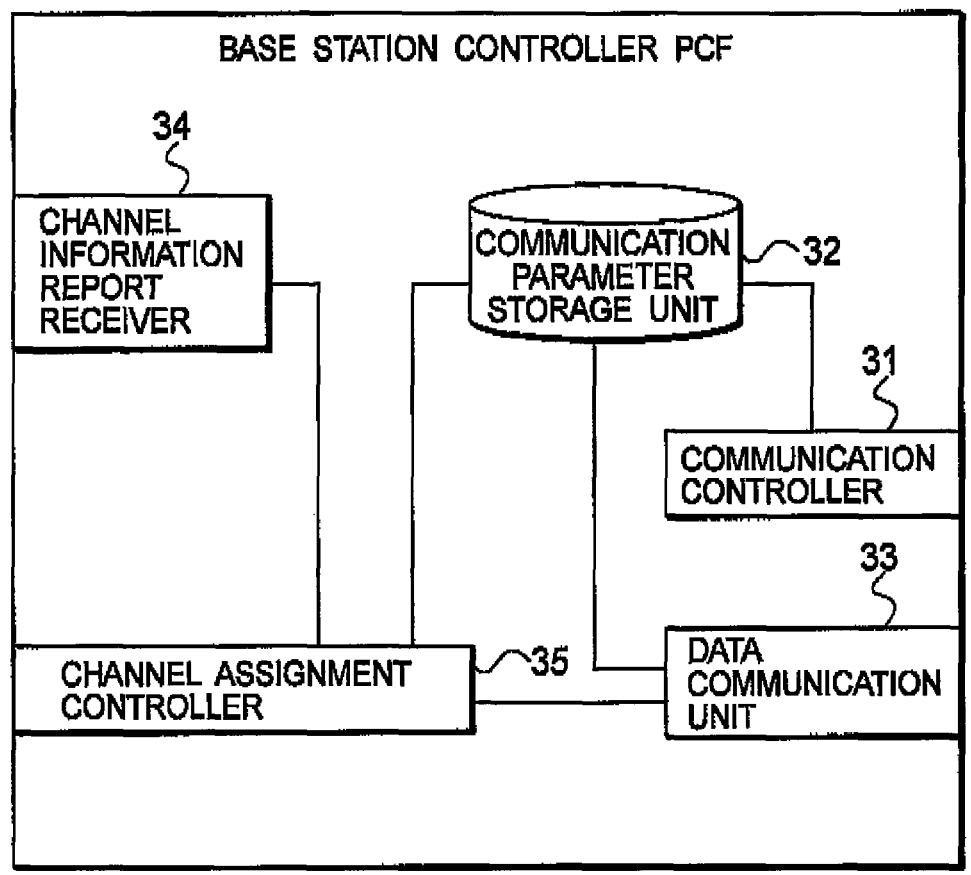
FIG. 9 is a functional block diagram of a base station controller according to a second embodiment of the present invention.

The following will explain a configuration of a mobile communication system according to a second embodiment of the present invention with reference to FIG. 1 and FIG. 9. The following will explain mainly a difference between the configuration of the mobile communication system according to the aforementioned first embodiment of the present invention and that of the mobile communication system according to the present embodiment.

As shown in FIG. 9, the base station controller PCF according to the present embodiment includes a communication controller 31, a communication parameter storage unit 32, a data communication unit 33, a channel information report receiver 34 and a channel assignment controller 35.

The communication controller 31 is configured to perform traffic channel (TrCH) setting processing for performing data communication (packet communication) carried out by each communication terminal AT.

The communication controller 31 is also configured to set communication parameters necessary for performing the data communication, for example, handoff candidate threshold, handoff candidate deletion threshold, handoff candidate minimum carrier number, minimum held carrier number, or the like.

For example, the communication controller 31 may be configured to set the communication parameters according to "Configuration Request" sent from each communication terminal AT.

The communication controller 31 may be configured to set the communication parameters in accordance with circumstances of the base station controller PCF at any timing.

The communication parameter storage unit 32 is configured to store the communication parameters set with respect to each communication terminal AT. The data communication unit 33 is configured to perform data communication using the communication parameters stored in the communication parameter storage unit 32. For example, the data communication unit 33 is configured so that data destined for each communication terminal AT is distributed and transmitted to an appropriate sector.

The channel information report receiver 34 is configured to receive a channel information report (RU) for setting a specific channel as a handoff candidate (adding it as a handoff a candidate).

The channel assignment controller 35 is configured to assign a resource to a specific channel in a specific sector according to the channel information report (RU) received from the communication terminal AT.

For example, the channel assignment controller 35 is configured to assign a resource (new channel) to a specific channel in the second sector β when receiving from the communication terminal AT a channel information report (RU) for adding the specific channel in the second sector β as a handoff candidate and if the number of channels set as handoff candidates in the second sector β reaches a predetermined number (handoff candidate minimum carrier number) or more by setting the specific channel as a handoff candidate.

In this case, even when receiving the channel information report (RU) for setting the specific channel in the second sector β as a handoff candidate, the channel assignment controller 35 is configured not to assign a resource to the specific channel in the second sector β unless the number of channels set as handoff candidates in the second sector β does not reach a predetermined number (handoff executed minimum carrier number) or more by setting the specific channel as a handoff candidate.

Moreover, when receiving a channel information report (RU) for not setting a specific channel in the first sector α as a handoff candidate (deleting it from handoff candidates) and if the number of channels set as handoff candidates in the first sector α is reduced below a predetermined number (minimum held carrier number) by releasing the specific channel from serving as a handoff candidate, the channel assignment controller 35 is configured to release assignment of resources from all channels set as handoff candidates in the first sector α.

Here, even when receiving the channel information report (RU) for deleting the specific channel in the first sector α from handoff candidates. the channel assignment controller 35 is configured to release only an assignment of a resource to the specific channel in the first sector α unless the number of channels set as handoff candidates in the first sector α is not reduced below a predetermined number (minimum held carrier number) by deleting the specific channel from handoff candidates.

(Operation of the Mobile Communication System according to the Second Embodiment of the Present Invention)

Figure 10:
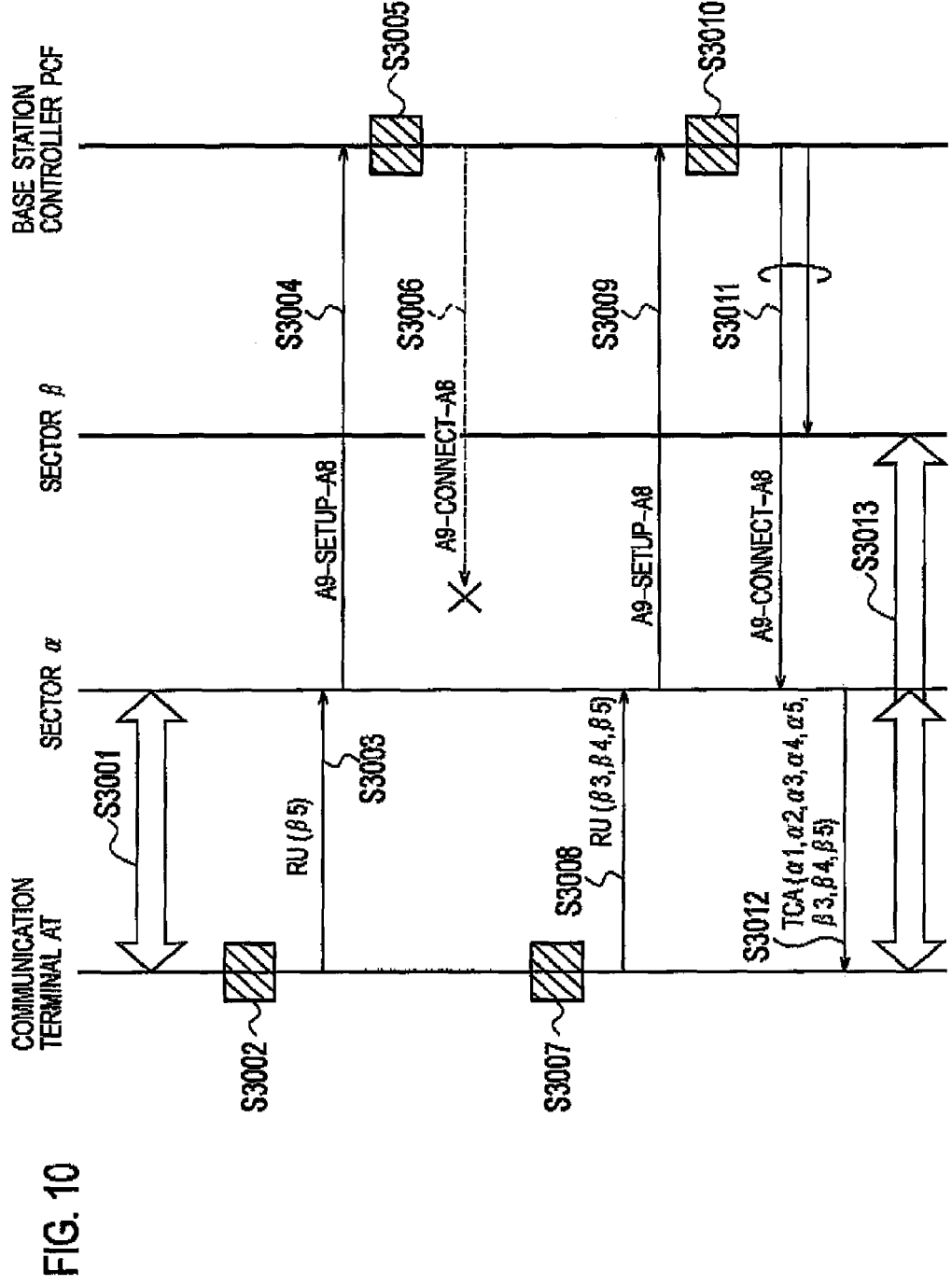
FIG. 10 is a sequence diagram showing handoff candidate addition processing when the number of sectors is increased in a mobile communication system according to the second embodiment of the present invention.
Figure 11:
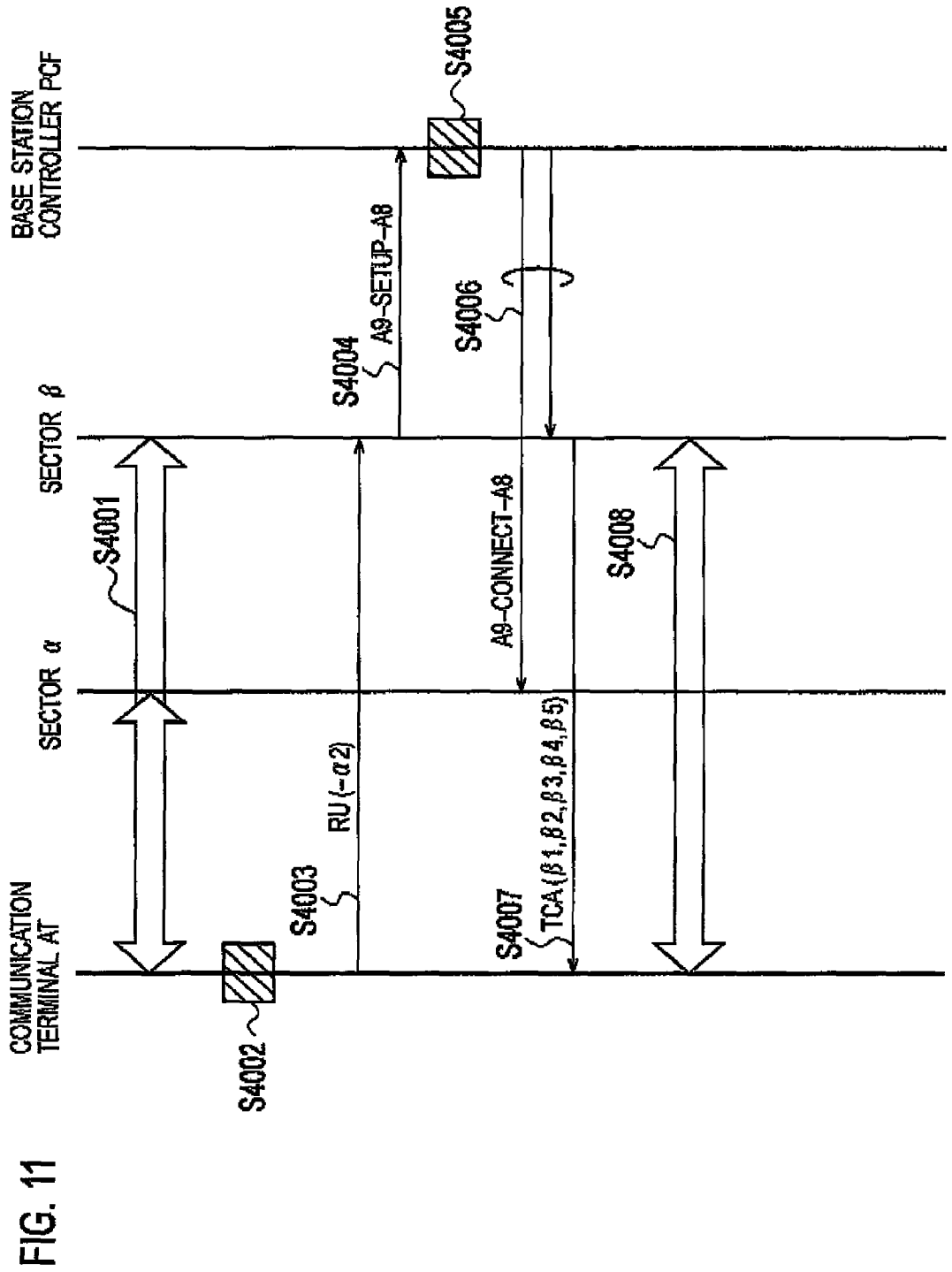
FIG. 11 is a sequence diagram showing handoff candidate deletion processing when the number of sectors is decreased in the mobile communication system according to the second embodiment of the present invention.

The following will explain an operation of the mobile communication system according to the second embodiment of the present invention with reference to FIG. 10 and FIG. 11.

First, with reference to FIG. 3 and FIG. 10, an explanation will be given of an operation of the mobile communication system according to the present embodiment in the case where the number of channel settable sectors in the communication terminal AT increases. In this case, as shown in FIG. 3, it is assumed that the communication terminal AT moves from the position A to the position B and receiving quality of the pilot signal of each channel (carrier) is changed from Table a to Table b.

As shown in FIG. 10, in step S3001, the communication terminal AT is present at the position A and performs communication using channels α1 to α5 set between itself and the first sector α. Here, it is assumed that the handoff candidate threshold (received signal strength of the pilot signal) is "−80 (dB)" and the handoff candidate minimum carrier number is "3."

In step S3002, it is assumed that the receiving quality of the pilot signal of channel β5 exceeds the handoff candidate threshold (see Table a).

The receiving quality of the pilot signal of channel β5 is "−79 (dB)" and exceeds the handoff threshold of "−80 (dB)", and therefore, in step S3003, the communication terminal AT determines that the channel β5 should be added as a handoff candidate and transmits a channel information report (RU (β5)) for adding the channel β5 as a handoff candidate.

In step S3004, the first sector α transmits to the base station controller PCF a message of "A9-Setup-A8" for notifying the channel information report (RU) for adding the channel β5 as a handoff candidate according to the received channel information report.

In step S3005, the base station controller PCF receives the message of "A9-Setup-A8" for notifying the channel information report (RU) for adding the channel β5 as a handoff candidate; however, by adding the channel β5 as a handoff candidate, the number of channels set as handoff candidates in the second sector β becomes "1" (only channel β5) and the handoff candidate minimum carrier number does not reach "3" or more, and therefore the base station controller PCF determines that no resource is assigned to the channel β5 in the second sector β.

Accordingly, in step S3006, the base station controller PCF does not transmit a message of "A9-Connect-A8" for notifying a result of the resource assignment to the channel β5 in the second sector β.

In step S3007, as a result of movement of the communication terminal AT to the position B, the receiving quality of a pilot signal of channel β3 becomes "−78 (dB)", the receiving quality of a pilot signal of channel β4 becomes "−75 (dB)" and the receiving quality of a pilot signal of channel β5 becomes "−77 (dB)," (see Table b).

As a result, the receiving quality of the pilot signals of channels β3 to β5 exceeds the handoff candidate threshold of "−80 (dB)", and therefore the communication terminal AT determines that the channels β3 to β5 should be set as handoff candidates, and in step S3008, transmits a channel information report (RU (β3, β4, β5)) for adding the channels β3 to β5 as to handoff candidates.

In step S3009, the first sector α transmits to the base station controller PCF a message of "A9-Setup-A8" for notifying a channel information report (RU) for performing handoff of is channels β3 to β5 to the second sector β according to the received channel information report.

In step S3010, the base station controller PCF receives the message of "A9-Setup-A8" for notifying the channel information report (RU) for adding the channels β3 to β5 as handoff candidates, and by setting the channels β3 to β5 as handoff candidates, the number of channels set as handoff candidates in the second sector β becomes "3" and the handoff candidate minimum carrier number reaches "3" or more, and therefore the base station controller PCF determines that resources are assigned to the channels β3 to β5 in the second sector β.

In step S3011, the base station controller PCF notifies the first sector α and second sector β of a result of the resource assignment (channels β3 to β5) by the message of "A9-Connect-A8."

In step S3012, the first sector α notifies the communication terminal AT of the result of the resource assignment (channels β3 to β5) in the second sector β by "TCA (α1, α2, α3, α4, α5, β3, β4, β5)."

In step S3013, the communication terminal AT can optionally execute handoff of the channels β3 to β5 according to the received TCA and perform communication using the channels α1 and α2 set between itself and the first sector α and the channels β3 to β5 set between itself and the second sector β.

Second, with reference to FIGS. 6 and FIG. 11, an explanation will be given of an operation of the mobile communication system according to the present embodiment in the case where the number of channel settable sectors in the communication terminal AT decreases. In this case, as shown in FIG. 6, it is assumed that the communication terminal AT moves from the position C to the position D and receiving quality of the pilot signal of each channel (carrier) is changed from Table d to Table e.

As shown in FIG. 11, in step S4001, the communication terminal AT is present at the position C and performs communication using channels α1 and α2 set between itself and the first sector α and channels β3 to β5 set between itself and the second sector β. Here, it is assumed that a handoff candidate deletion threshold (received signal strength of the pilot signal) is "−100 (dB)" and the minimum held carrier number is "2."

In step S4002, it is assumed that the receiving quality of the pilot signal of channel α2 set between itself and the first sector α falls below the handoff candidate deletion threshold (see Table d).

The receiving quality of the pilot signal of channel (α2 becomes "−103 (dB)" and falls below the handoff candidate is deletion threshold of "−100 (dB)", and therefore in step S4003 the communication terminal AT determines that the channel α2 should be deleted from handoff candidates and transmits a channel information report (RU (−α2)) for deleting the channel α2 from handoff candidates.

In step S4004, the first sector α transmits to the base station controller PCF a message of "A9-Setup-A8" for notifying the channel information report (RU) for deleting the channel α2 from handoff candidates according to the received channel information report.

In step S4005, the base station controller PCF receives the message of "A9-Setup-A8" for notifying the channel information report (RU) for deleting the channel α2 from handoff candidates, and by deleting the channel α2 from handoff candidates, the number of channels set as handoff candidates in the first sector α becomes "1" and the minimum held carrier number is reduced below "2", and therefore the base station controller PCF determines to release assignment of resources from the channel α1 as well as to the channel α2 (even if the receiving quality of the pilot signal of the channel α1 does not fall below the handoff candidate deletion threshold).

In step S4006, the base station controller PCF notifies the first sector α and second sector β of the resource assignment release result (channels α1 and α2) by the message of "A9-Connect-A8."

In step S4007, the first sector α notifies the communication terminal AT of the resource assignment-release result (channels α1 and α2) in the first sector α by use of "TCA (β1, β2, β3, β4, β5)."

In step S4008, the communication terminal AT can optionally execute handoff of the channels α1 and α2 according to the received TCA and perform communication using the channels β1 to β5 set between itself and the second sector β (see Table e).

(Effects and Advantages of the Mobile Communication System according to the Second Embodiment of the Present Invention)

According to the mobile communication system of the present embodiment, even when the base station controller PCF receives the channel information report (RU) for adding the channel β5 in the second sector β to handoff candidates, the channel β5 is not added to handoff candidates unless the number of channels set as handoff candidates in the second sector β reaches the predetermined number (handoff candidate minimum carrier number) or more by adding the channel β5 to handoff candidates, and therefore the mobile communication system can avoid formation of a state in which the channels the number of which is less than the predetermined number (handoff candidate minimum carrier number) are set between itself and the second sector β by the communication terminal AT.

According to the mobile communication system of the present embodiment, when the base station controller PCF receives the channel information report (RU) for deleting the channel α2 in the first sector α from handoff candidates, all channels (channels α1 and α2) set as handoff candidates in the first sector α are deleted from handoff candidates if the number of channels set as handoff candidates in the first sector α is reduced below the predetermined number (minimum held carrier number) by deleting the channel α2 from handoff candidates, and therefore it is possible to avoid maintenance of a state in which the channels the number of which is less than the predetermined number (minimum held carrier number) are set between the communication terminal AT and the first sector α.

Note that the entire contents of Japanese Patent Application No. 2005-370176 (filed on Dec. 22, 2005) are incorporated in this description herein by reference.

Heretofore, the present invention has been described in detail with reference to the above embodiments, but it will be evident to those skilled in the art that the present invention is not limited to the embodiments described in the present specification. The present invention can be implemented as modified and changed modes without departing from the spirit and scope of the present invention defined by the statements of claims. Therefore, statements in the present application aim at illustration and description, and do not restrict the present invention in any sense.

INDUSTRIAL APPLICABILITY

As explained above, according to the present invention, it is possible to provide a communication terminal, a base station controller and a mobile communication method that reduce a load on a mobile communication system side by preventing each communication terminal from setting channels the number of which is less than a predetermined number, between itself and each sector.

The invention claimed is:

1. A communication terminal configured to perform communication using channels set between the communication terminal and a plurality of sectors, comprising: a determination unit configured to determine whether or not each channel should be set as a handoff candidate, on the basis of reception quality of a pilot signal; and a channel information report transmitter configured to transmit a channel information report for setting a specific channel as a handoff candidate when the number of channels set as handoff candidates in the same sector reaches a predetermined number or more by setting the specific channel as a handoff candidate; wherein even when it is determined that the specific channel should be set as a handoff candidate, the channel information report transmitter is configured not to transmit the channel information report for setting the specific channel as a handoff candidate if the number of channels set as handoff candidates in the same sector does not reach a predetermined number or more.

2. A communication terminal configured to perform communication using channels set between the communication terminal and a plurality of sectors, comprising: a determination unit configured to determine whether or not each channel should be set as a handoff candidate, on the basis of reception quality of a pilot signal; and a channel information report transmitter configured to transmit a channel information report for excluding all channels set as handoff candidates in the same sector from a handoff candidate if the number of channels set as handoff candidates in the sector is reduced below a predetermined number by excluding the specific channel from a handoff candidate; wherein when it is determined that the specific channel should not be set as a handoff candidate and if the number of channels set as handoff candidates in the sector is not reduced below a predetermined number by excluding the specific channel from a handoff candidate, the channel information report transmitter is configured to transmit a channel information report for excluding only the specific channel from a handoff candidate.

3. A base station controller configured to control communication using channels set between a communication terminal and a plurality of sectors, comprising: a channel information report receiver configured to receive a channel information report for setting a specific channel as a handoff candidate; and a channel assignment controller configured to assign a resource to the specific channel in the same sector when receiving the channel information report for setting the specific channel as a handoff candidate and if the number of channels set as handoff candidates in the sector reaches a predetermined number or more by setting the specific channel as a handoff candidate; wherein even when receiving the channel information report for setting the specific channel as a handoff candidate, the channel assignment controller is configured not to assign a resource to the specific channel in the sector if the number of channels set as handoff candidates in the sector does not reach the predetermined number or more by setting the specific channel as a handoff candidate.

4. A base station controller configured to control communication using channels set between a communication terminal and a plurality of sectors, comprising: a channel information report receiver configured to receive a channel information report for excluding a specific channel from a handoff candidate; and a channel assignment controller configured to release assignment of a resource for all channels set as handoff candidates in the same sector when receiving the channel information report for excluding the specific channel from a handoff candidate and if the number of channels set as handoff candidates in the sector is reduced below a predetermined number by excluding the specific channel from a handoff candidate; wherein when receiving the channel information report for excluding the specific channel from a handoff candidate and if the number of channels set as handoff candidates in the sector is not reduced below the predetermined number by excluding the specific channel from a handoff candidate, the channel assignment controller is configured to release only assignment of a resource for the specific channel in the sector.

5. A mobile communication method for performing communication using channels set between a communication terminal and a plurality of sectors, comprising the steps of: determining whether or not each channel should be set as a handoff candidate, on the basis of reception quality of a pilot signal, in the communication terminal; transmitting a channel information report for setting a specific channel as a handoff candidate if the number of channels set as handoff candidates in the same sector reaches a predetermined number or more by setting the specific channel as a handoff candidate, in the communication terminal; and assigning a resource, to the specific channel in accordance with the channel information report in a base station controller configured to control the communication; wherein even when it is determined that the specific channel should be set as a handoff candidate, the channel information report for setting the specific channel as a handoff candidate is not transmitted if the number of channels set as handoff candidates in the same sector does not reach a predetermined number or more.

6. A mobile communication method for performing communication using channels set between a communication terminal and a plurality of sectors, comprising the steps of: determining whether or not each channel should be set as a handoff candidate, on the basis of reception quality of a pilot signal, in the communication terminal; transmitting a channel information report for excluding all channels set in the same sector from a handoff candidate if the number of channels set as handoff candidates in the sector is reduced below a predetermined number by excluding the specific channel as a handoff candidate in the communication terminal; and releasing assignment of a resource for all the channels in the sector in accordance with the channel information report, in a base station controller configured to control the communication; , wherein when it is determined that the specific channel should not be set as a handoff candidate and if the number of channels set as handoff candidates in the sector is not reduced below a predetermined number by excluding the specific channel from a handoff candidate, a channel information report for excluding only the specific channel from a handoff candidate is transmitted.

7. A mobile communication method for performing communication using channels set between a communication terminal and a plurality of sectors, comprising the steps of: determining whether or not each channel should be set as a handoff candidate, on the basis of reception quality of a pilot signal in the communication terminal; transmitting a channel information report for setting a specific channel as a handoff candidate, in the communication terminal; and assigning a resource to the specific channel in the same sector when the channel information report is received and if the number of channels set as handoff candidates in the sector reaches a predetermined number or more by setting the specific channel as a handoff candidate, in a base station controller configured to control the communication; wherein even when receiving the channel information report for setting the specific channel as a handoff candidate, a resource is not assigned to the specific channel in the sector if the number of channels set as handoff candidates in the sector does not reach the predetermined number or more by setting the specific channel as a handoff candidate.

8. A mobile communication method for performing communication using channels set between a communication terminal and a plurality of sectors, comprising the step of: determining whether or not each channel should be set as a handoff candidate, on the basis of reception quality of a pilot signal in the communication terminal; transmitting a channel information report for excluding a specific channel from a handoff candidate, in the communication terminal; and releasing assignment of a resource for all channels set as handoff candidates in the same sector when the channel information report is received and if the number of channels set as handoff candidates in the sector is reduced below a predetermined number by excluding the specific channel from a handoff candidate, in a base station controller configured to control the communication, wherein when receiving the channel information report for excluding the specific channel from a handoff candidate and if the number of channels set as handoff candidates in the sector is not reduced below the predetermined number by excluding the specific channel from a handoff candidate, only assignment of a resource for the specific channel in the sector is released.

* * * * *